United States Patent [19]
Koch et al.

[11] Patent Number: 5,849,202
[45] Date of Patent: Dec. 15, 1998

[54] ROTARY DISC FILTRATION PROCESS HAVING MEANS TO PREVENT SETTLEMENT OF SOLIDS

[75] Inventors: Manfred Koch, Graz; Hubert Riemer, Oswald, both of Austria

[73] Assignee: Andritz-Patentverwaltungs-Gesellschaft M.B.H., Graz, Austria

[21] Appl. No.: 917,737

[22] Filed: Aug. 27, 1997

Related U.S. Application Data

[63] Continuation of Ser. No. 601,536, Feb. 14, 1996, abandoned, which is a continuation of Ser. No. 145,859, Nov. 5, 1993, abandoned.

[30] Foreign Application Priority Data

Nov. 6, 1992 [AT] Austria .................................... 2193/92

[51] Int. Cl.$^6$ ............................ B01D 37/00; B01D 33/06
[52] U.S. Cl. ......................... 210/780; 210/784; 210/805; 210/808; 210/248; 210/331; 210/196; 210/197; 210/456; 210/383; 210/408; 210/413; 210/219; 210/319
[58] Field of Search ..................................... 210/780, 784, 210/791, 805, 806, 808, 330, 331, 332, 391, 396, 398, 406, 407, 248, 196, 197, 456, 383, 408, 413, 219, 319

[56] References Cited

U.S. PATENT DOCUMENTS

| | | | |
|---|---|---|---|
| 2,699,872 | 1/1955 | Kelsey ..................................... | 210/383 |
| 2,899,066 | 8/1959 | Peterson et al. . | |
| 2,932,402 | 4/1960 | Logue et al. ............................. | 210/407 |
| 3,080,064 | 3/1963 | Giesse ..................................... | 210/407 |
| 3,250,396 | 5/1966 | Armstrong et al. ..................... | 210/332 |
| 3,317,050 | 5/1967 | Daman .................................... | 210/332 |
| 3,471,026 | 10/1969 | Riker ....................................... | 210/332 |
| 3,814,257 | 6/1974 | Schmidt, Jr. ............................ | 210/332 |
| 4,017,399 | 4/1977 | Lopker .................................... | 210/332 |
| 4,086,168 | 4/1978 | Moore ..................................... | 210/332 |
| 4,332,680 | 6/1982 | O'Cheskey .............................. | 210/332 |
| 4,704,206 | 11/1987 | Barra ....................................... | 210/331 |
| 4,995,991 | 2/1991 | Ljokkoi et al. ......................... | 210/407 |
| 5,227,064 | 7/1993 | Strid ........................................ | 210/402 |
| 5,262,069 | 11/1993 | Kato ........................................ | 210/402 |
| 5,540,846 | 7/1996 | Koch et al. ............................. | 210/741 |

FOREIGN PATENT DOCUMENTS

| | | |
|---|---|---|
| 2102344 | 5/1994 | Canada ......................... B01D 33/06 |
| 4005737 | 10/1991 | Germany . |
| 3924658 | 11/1991 | Germany . |
| 552329 | 12/1956 | Italy . |
| 613629 | 10/1979 | Switzerland . |
| 9106703 | 9/1990 | WIPO . |
| 9206764 | 10/1990 | WIPO . |

*Primary Examiner*—Robert J. Popovics
*Attorney, Agent, or Firm*—Roylance, Abrams, Berdo & Goodman, L.L.P.

[57] ABSTRACT

A process and device for the filtration of solid-liquid mixtures, in particular, solid-liquid suspensions with readily sedimenting substances, uses a filtration device such as a rotary filter optionally operating at an overpressure and in a pressure vessel. The process primarily comprises producing a movement in addition to the natural or usual filtration movement of the or in the mixture. Conveniently, a filtration device and, in particular, with rotary filters in a pressure vessel, includes a partly open feeding device, in particular, a feeding pipe for the supply of mixture or suspension, and a device for additionally influencing the natural or usual filtration movement of or in the mixture or suspension for generating an additional flow of the mixture.

21 Claims, 8 Drawing Sheets

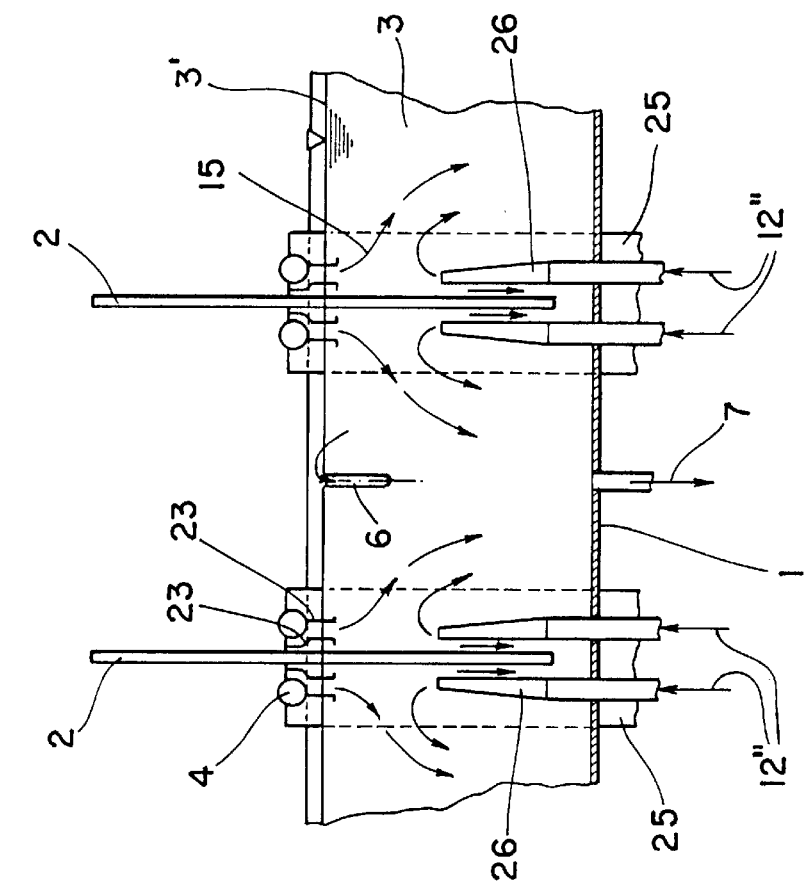
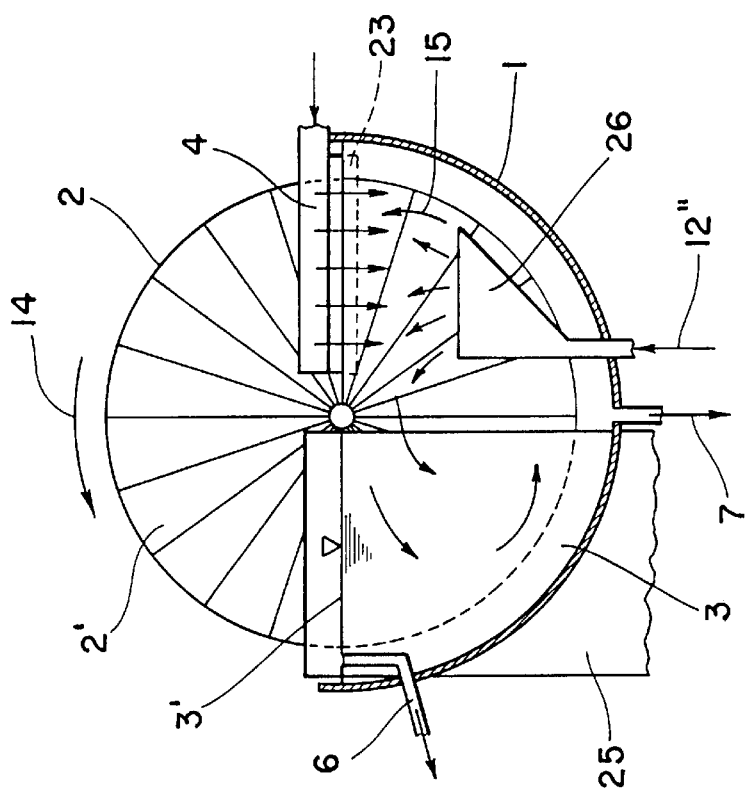

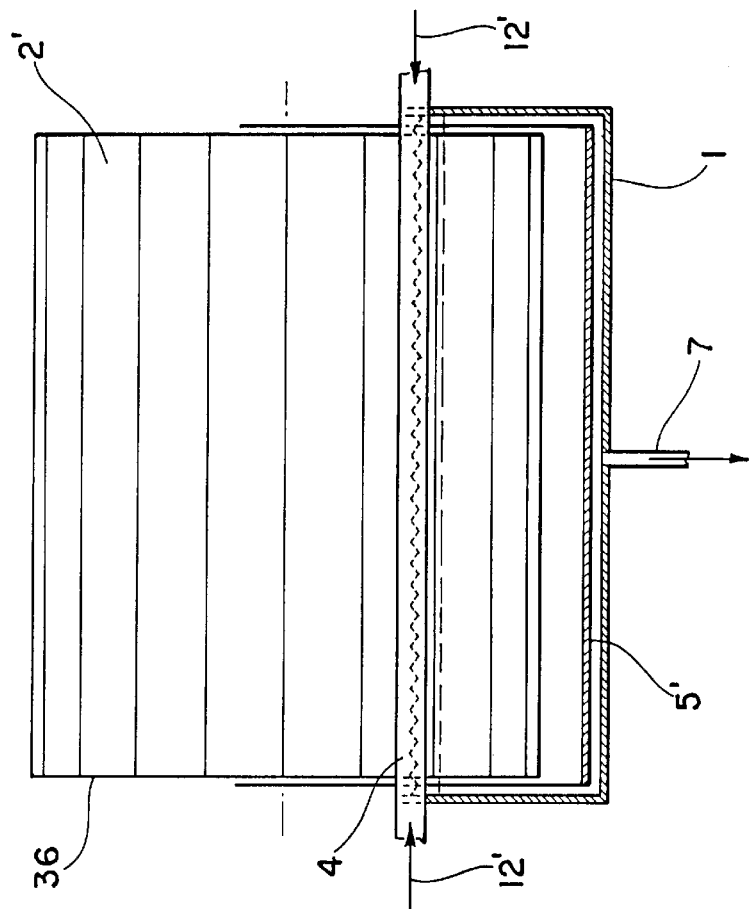
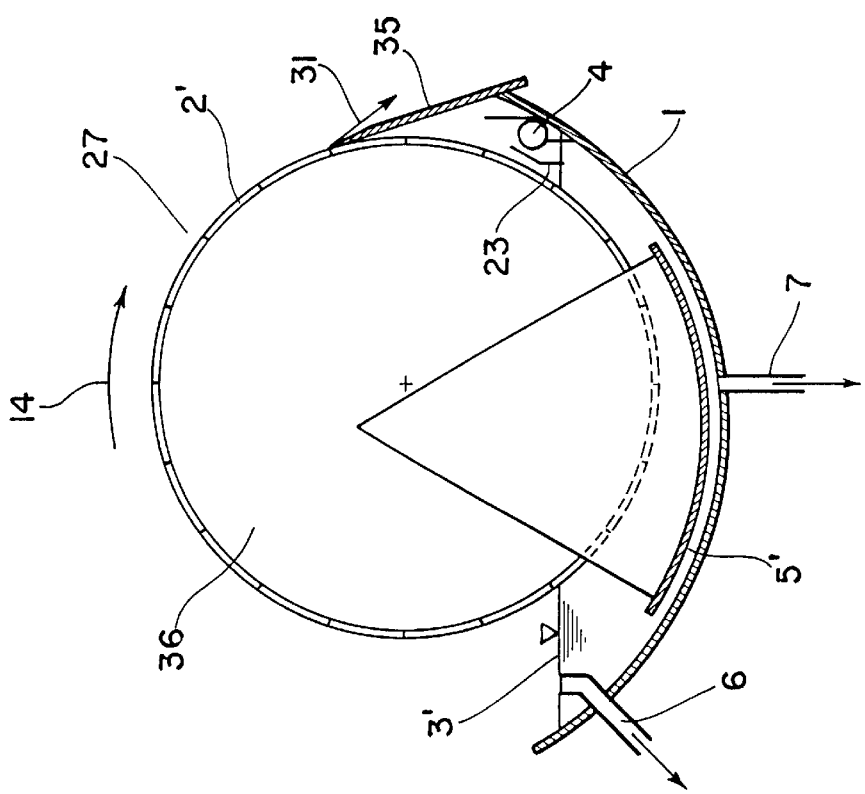
FIG. 7b
FIG. 7a

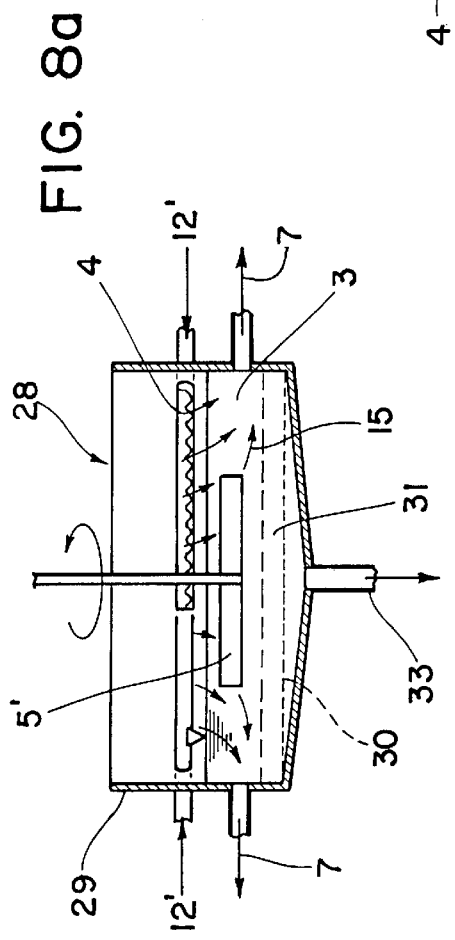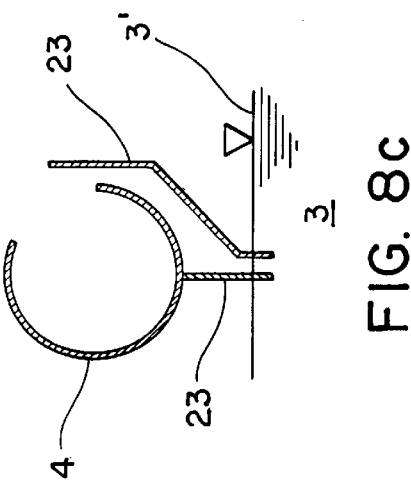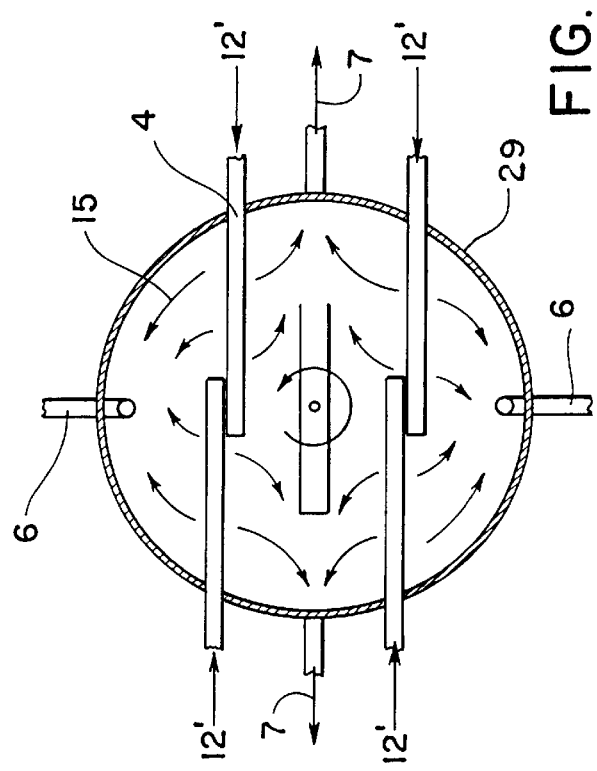

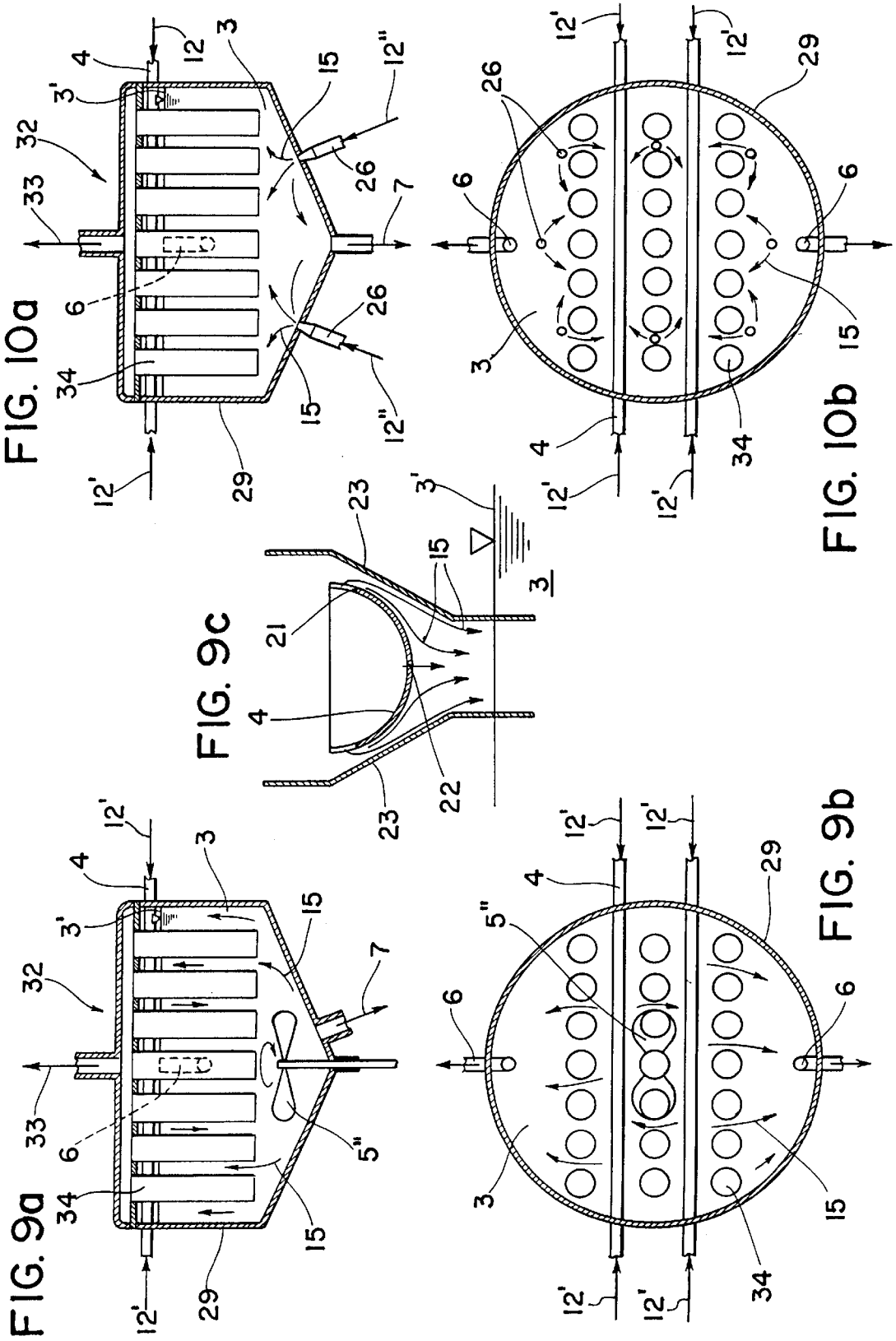

ROTARY DISC FILTRATION PROCESS HAVING MEANS TO PREVENT SETTLEMENT OF SOLIDS

This application is a file wrapper continuation of application Ser. No. 08/601,536 filed Feb. 14, 1996, now abandoned, which is a continuation of application Ser. No. 08/145,859, filed Nov. 5, 1993, now abandoned.

FIELD OF THE INVENTION

The present invention relates to a process and device for the filtration of solid-liquid mixtures, in particular, of solid-liquid suspensions containing readily sedimenting substances. The invention is particularly directed to a filtration process using a rotary filter, which can operate at an over-pressure or in a pressure vessel.

BACKGROUND OF THE INVENTION

Many processes and devices for filtration are known. In particular, rotary filters, i.e., rotary disk filters and drum filters, are used for this purpose. For readily sedimenting substances, expensive vacuum band filters are frequently used as well. This results in a very irregular structure of the filter cake. Consequently, high amounts of air are required. Thus, the present invention aims at solving the problem of irregular structure of the filter cake, and, in particular, of the tendency towards sedimentation of solid-liquid mixtures in the filter container or filter trough. The invention is particularly desirable when rotary filters such as rotary disk or drum filters are used. Such problems primarily occur in the field of mineral processing when filtering coal suspensions, ore suspensions such as copper, lead, zinc, pyrite, magnesite, magnetite suspensions, as well as with various sands, earth slurries and the disposal of contaminated ground.

SUMMARY OF THE INVENTION

According to one aspect of the invention, during filtration, an induced flow or movement of and in the solid-liquid mixture, in particular suspension, is carried out in addition to the natural or usual filtration movement through the filtration device. As used herein, the term mixture is intended to include solid-liquid mixtures and solid-liquid suspensions. According to the invention, this additional flow movement of the mixture may be achieved by a mixture overflow at the surface of the mixture and/or a mixture discharge below the surface. By this induced additional movement, the mixture is sufficiently maintained in a mixed state during the filtration process. The amount of overflow, which is determined by the difference between the amount of supply and the amount of filtered mixture removed, also serves to even out the solid content in the liquid and to homogenize the mixture during the filtration process.

According to a further embodiment of the invention, the induced additional movement may be produced by an agitation means or by the additional jetting or injecting of the solid-liquid mixture into the mixture in the filtration device.

A further embodiment of the invention is characterized in that the induced flow movement of the mixture produces a flow against the direction of the supply of the mixture. In this manner, the heavy particles which tend to settle too quickly are kept in suspension by the flow and produce a uniform filter cake on the filter device.

A favorable embodiment of the invention is characterized in that the amount of overflow of the mixture from the filtration device is recycled to the mixture supply. This recycle circuit provides a particularly favorable control of the amount and speed of the supply to prevent rapid sedimentation of the heavy particles.

A further and particularly favorable embodiment of the invention is characterized in that a part of the mixture or suspension is drawn off at the lowest point or in the lowest region of the filter device through a discharge outlet. When a rotary filter is used, it is particularly desirable to remove the mixture from the lowest point of the filter container. According to a development of the invention, the portion of the mixture or suspension that has been drawn off is recycled to the supply. In this way, a flow is maintained at the lowest point or in the lowest region of the trough of the filter device and, thus, across the total area to prevent sedimentation of the mixture. The amount of mixture drawn off may be circulated in a simple way and fed to the mixture or suspension supply together with the overflow from the filtration device.

The invention furthermore is directed to a filtration device, and in particular, rotary filters which can operate in a pressure vessel which comprises at least one, preferably partly open feeding means, such as a feeding pipe for the supply of mixture or suspension to the filtration device, and a means for additionally influencing and inducing a flow in addition to the natural or usual filtration movement of the or in the mixture or suspension through the device. The feeding means and the means for additionally influencing the movement of the mixture or suspension slow down the rate of sedimentation and homogenize the mixture or suspension or pulp during the filtration process.

According to the invention, the additional flow movement of the mixture or suspension may be achieved by means of an overflow, an agitator, a nozzle for the additional supply of solid-liquid mixture or suspension and/or an additional mixture or suspension discharge. Typically, overflow channels are only used when necessary to maintain the suspension. With the process or device according to the present invention, the overflow must accommodate a constant overflow rate. By means of a partly open feeding means, in particular, a feeding pipe, the mixture or suspension may be optimally guided into the trough of the filtration device.

A preferable embodiment of the invention comprises a feeding means, in particular, a feeding pipe with an indented overflow edge and a cut-out portion. As a further embodiment of the invention, the feeding means is provided with discharge openings, in particular discharge bores, in the bottom of the pipe. The indented edge of the feeding pipe directs the mixture or suspension into the filter trough in a directed jet. The discharge openings in the bottom of the feeding pipe prevent sedimentation in the feeding means.

A favorable embodiment of the invention comprises guiding plates to target or direct the mixture or suspension into the filter container or filter trough. The guiding plates are positioned adjacent the feeding means for the supply of mixture or suspension. These guiding plates may, according to a further embodiment of the invention, extend below the mixture or suspension surface in the filter container or filter trough. The guiding plates, and in particular, the plates extending below the mixture or suspension surface, direct the supply of mixture or suspension into the filter trough relatively slowly, and thus, prevent swirls and washing away of the solids collected on the filter.

According to a further embodiment of the invention, the overflow or overflow channel communicates with at least one mixture or suspension feeding device via a mixture or suspension collector container and a supply pump. This arrangement circulates the material in a favorable way to control the amount of discharge.

According to a further favorable embodiment of the invention, a discharge opening is provided in the bottom or the lower region of the filter container, in particular, the filter trough of the rotary filter. The discharge opening communicates with the mixture or suspension feeding means via a mixture or suspension collector container and a feeding pump. The discharge in the bottom or in the lower region of the filter container produces a continuous downward flow and thus prevents sedimentation of the solids.

A favorable development of the invention is obtained by providing at least one guiding means in the filter container, in particular, filter trough of a rotary filter, on the side remote from the at least one agitator or from the at least one mixture or suspension nozzle. The guiding means prevents otherwise "dead corners" in the filter trough, and thus, prevents the danger of local sedimentation.

According to a further favorable embodiment of the invention, at least one guiding means, in particular in the form of a guiding plate, is provided in the region between the at least one agitator or the at least one mixture or suspension nozzle, and the rotating filter or sieving elements of the rotary filter or the like. These guiding means effectively prevent the turbulence generated by the agitator or the mixture or suspension nozzle from washing the solid matter from the filter. In rotary disk filters, this guiding means preferably is in the form of plates parallel to the filter disk in order to provide protection against washing the material off the filter disk. Depending on the material to be filtered or also on the design conditions, the agitator or the mixture or suspension nozzle may be positioned on the side of the mixture or suspension supply or on the side where the filter cake is removed. By appropriate choice of the arrangement, it is possible to achieve homogenization of the suspension and to prevent washing off of solid matter collected on the filter.

According to the invention, the overflow may be a channel or a pipe ending below the mixture or suspension surface. In both cases, the level of mixture or suspension is determined by the height of the inlet edge of the overflow. Alternatively, the height of the pipe may be variable.

A further embodiment of the invention comprises a rotary disk filter, at least one agitator and at least one mixture or suspension nozzle in the plane of and below the filter disk. The arrangement is particularly favorable in single-disk filters. When using a rotary filter with several disks, at least one agitator and at least one mixture or suspension nozzle may be provided next to the filter disk, and preferably, between two filter disks. Thus, a particularly favorable flow along the filter disks is achieved.

Additional influences of the additional motion in the mixture or suspension may be achieved by providing a flow pipe for the flow generator. An agitator such as a propeller is positioned inside the flow pipe. The effect of the additional movements of or in the mixture or suspension may be increased or fashioned by guiding means to redirect the mixture or suspension upwards or to the filter disks. Generally, the guiding means are positioned at or close to the mouth of the flow pipe.

The invention finds application not only with rotary disk filters, but also with drum filters, flat bed filters, and candle filters.

According to the invention, when using a drum filter, a swivelling agitator is provided in the filter trough between the drum filter shell and the interior wall of the trough. In a flat bed filter, a flat agitator is provided above the filter in the filter container.

A further modification of the invention comprises a candle filter, which can operate at an overpressure, an agitator or nozzle directing an additional solid-liquid mixture or suspension upwards toward the lower end of the filter candles. A suction is connected to the interior spaces of the filter candles to provide the necessary filtering action.

BRIEF DESCRIPTION OF THE DRAWINGS

The invention will now be described by way of example with reference to the accompanying drawings.

FIGS. 6a and 6b show side and end views of a further embodiment with a rotary filter having several disks;

FIGS. 7a and 7b show side and end views of an embodiment according to the invention with a drum filter;

FIGS. 8a and 8b show cross-section and top views of an embodiment with a flat bed filter;

FIG. 8c shows a cross-section across a feeding channel with a flat bed filter according to FIGS. 8a and 8b;

FIGS. 9a and 9b show cross-section and side views of an embodiment of the invention with a candle filter;

FIG. 9c shows a cross-section of a feeding channel for an embodiment according to FIGS. 9a and 9b; and FIGS. 10a and 10b show cross-section and top views of a further embodiment of the invention with a candle filter.

DETAILED DESCRIPTION OF THE INVENTION

Figure 1:
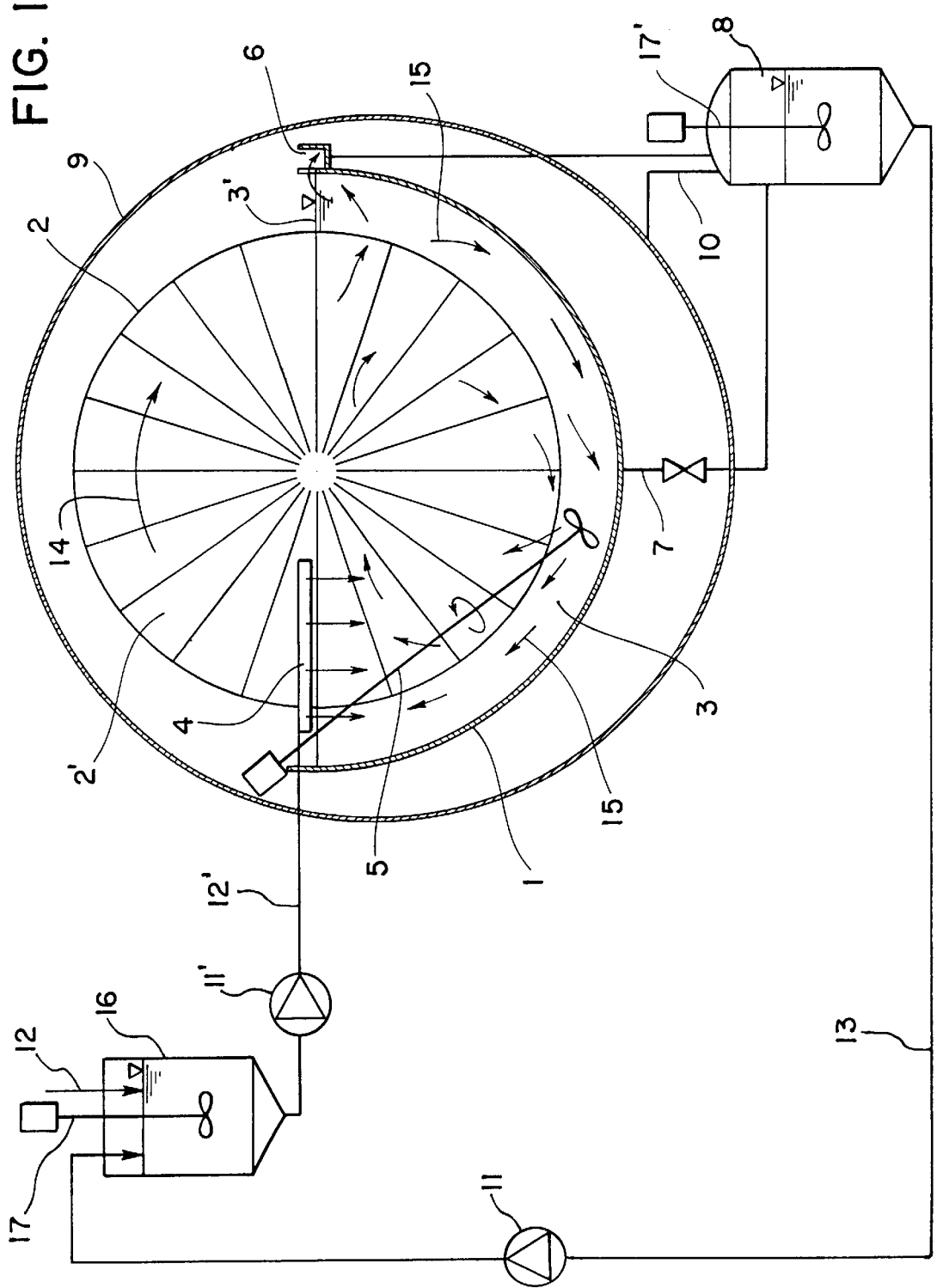
FIG. 1 is a cross-sectional view of an embodiment of the invention having a rotary filter.

A first embodiment of the invention is described with reference to FIG. 1. FIG. 1 shows a filter trough 1 of a rotary disk filter inside a pressure vessel 9. A solid suspension 3, which readily tends towards sedimentation of the larger particles is introduced into the filter trough 1. The filter disk 2 consists of a plurality of filter segments 2' rotating in direction 14 with the filtrate being sucked off through a filter medium into the hollow filter segments 2' and through the hollow filter shaft (not shown). The filter medium, for example, consists of plastics, fibrous material, sheathed glass fibers, ceramic web, or metal sieves attached to the filter segments 2'. The solid matter settles on the surface of the filter segments until the resulting filter cake is removed in the usual way, for instance by blow-back of compressed air or by scrapers. The suspension to be filtered is led through conduit 12 into a suspension supply container 16 having an agitator 17. A suspension pump 11' pumps the suspension through feeding conduit 12' to a feeding means 4 to introduce the mixture into the filter trough 1. Special feeding means will be described later on with reference to FIGS. 4a, 4b, 5a, 5b, 6a, 6b, 8c and 9c. In order to prevent rapid sedimentation of the solids, an induced flow 15 of the suspension is generated by an agitator 5. The induced flow is directed in a direction opposite the natural or usual flow of the suspension from the suspension supply. In order to maintain the flow 15, a portion of the suspension is withdrawn through an overflow channel 6 at the surface 3' of mixture 3 and through a discharge opening on the bottom of the filter trough 1 through line 7 into a suspension collecting container 8 having an agitator 17'. Overflow 6 is typically positioned on the side of the filtration device opposite the feed 4. When the arrangement is operated in a pressure vessel 9, the space between the pressure vessel 9 and the suspension collecting container 8 is connected to a pressure compensation line 10. The suspension is then guided into the suspension supply container 16 via a suspension return conduit 13 and pump 11. By carrying out the process in such a way, rapid sedimentation of the solid particles in the suspension 3 or in the trough 1 or on the filter medium is prevented. Preventing the sedimentation of the solids produces a uniform build-up of the filter cake on the filter media of the filter segments 2', and thus, uniform filtration with low air consumption without clogging of the filter medium by fine solid particles. The sedimentation on the bottom of the filter trough 1 is prevented by the suspension discharge 7 in the bottom of the trough.

Figure 2:
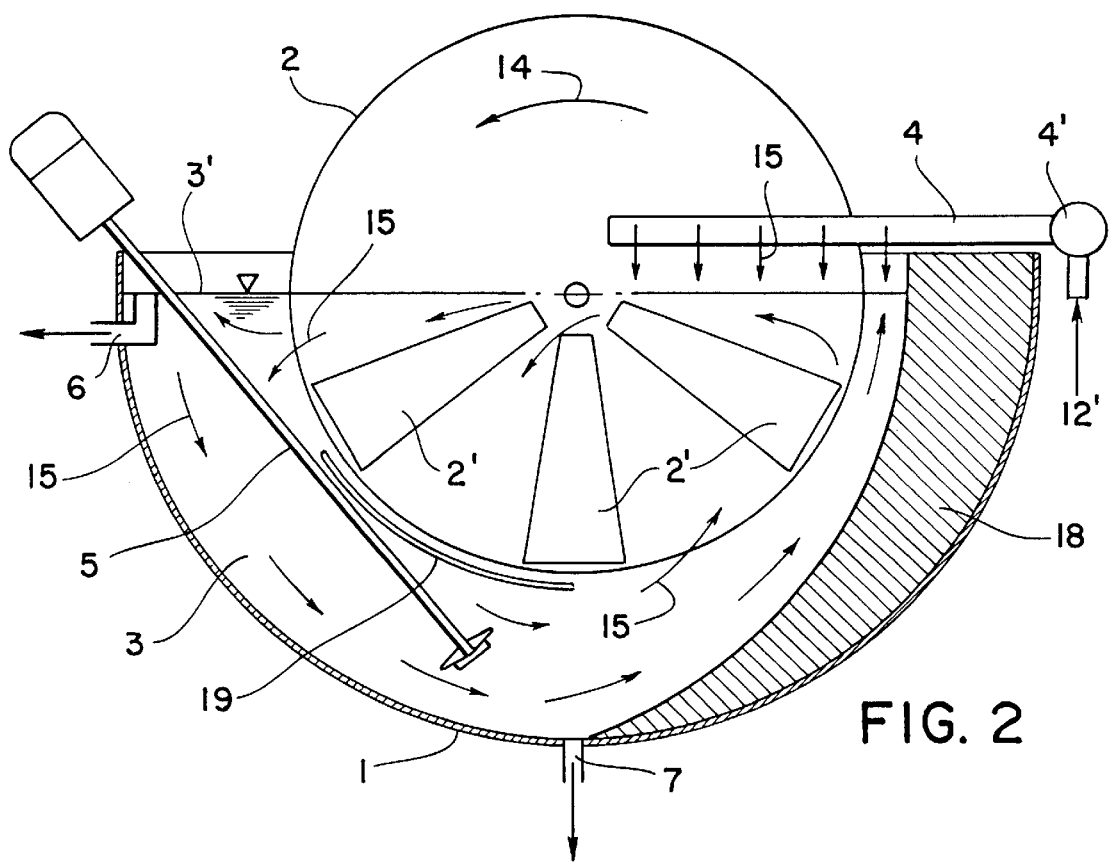
FIG. 2 shows a further embodiment of the invention having a rotary disk filter.

FIG. 2 illustrates a further embodiment of the invention where the filtration device is a rotary filter disk. The filtration takes place in the atmosphere and under normal atmospheric pressure. The suspension is guided from the suspension supply 12' via a feeding pipe 4' into the feeding means 4. The agitator 5 is positioned on the side of the filter disk 2 facing away from the supply feed means 4. The overflow is through an overflow pipe 6, such that the level of the suspension surface 3' is determined by the position of the upper edge of the overflow pipe 6. In order to avoid dead spaces, a guiding means 18 is provided on the supply side of the filter disk 2 in the filter trough 1. In this embodiment, the guiding means takes the form of a wedge conforming to the shape of the trough, widening towards the supply. Thus, in this region, the direction of flow 15 of the suspension 3 is determined. To prevent washing off the filter cake already collected on the filter disk, a further guiding means 19 in the form of a guiding plate is provided. The guiding plate 19 includes an arcuate portion conforming to the periphery of the filter disk 2 and lateral side members being parallel to the filter disk 2 and spaced apart from the surface of the filter disk as shown in FIG. 3.

Openings 19' in the form of holes or slots are provided on the guiding plate 19 to prevent sedimentation on the bottom. The openings 19' are shown in the three-dimensional representation of a device in FIG. 3. FIG. 3 also shows the holding scaffold 20 for the filter trough 1. The filter cake discharge chute 25 on both sides of the filter disk 2 is also shown. The other parts have the same reference numerals as the embodiment shown in FIG. 2.

Figure 4A:
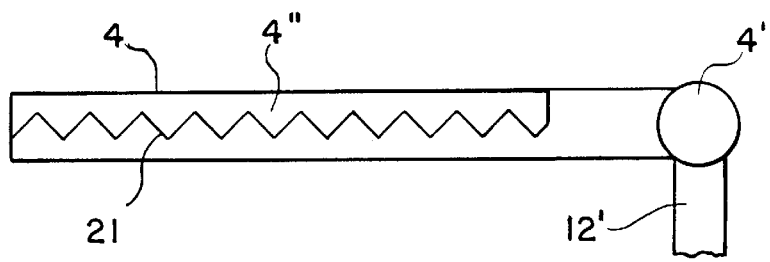
FIGS. 4a and 4b show side and end views of an embodiment of the invention with a rotary filter having several disks.
Figure 4B:
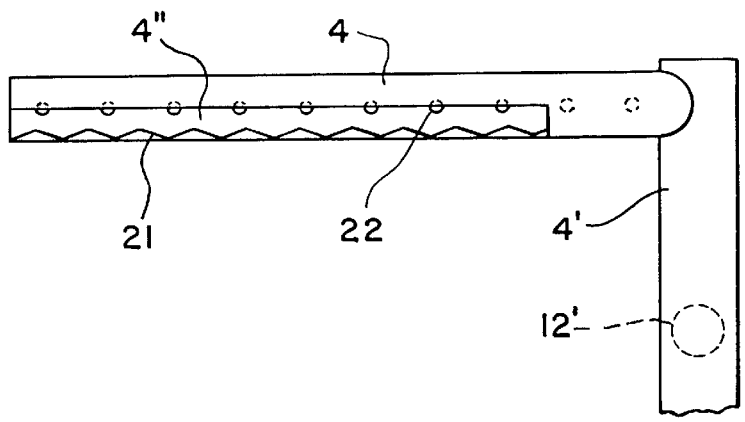
Figure 3:
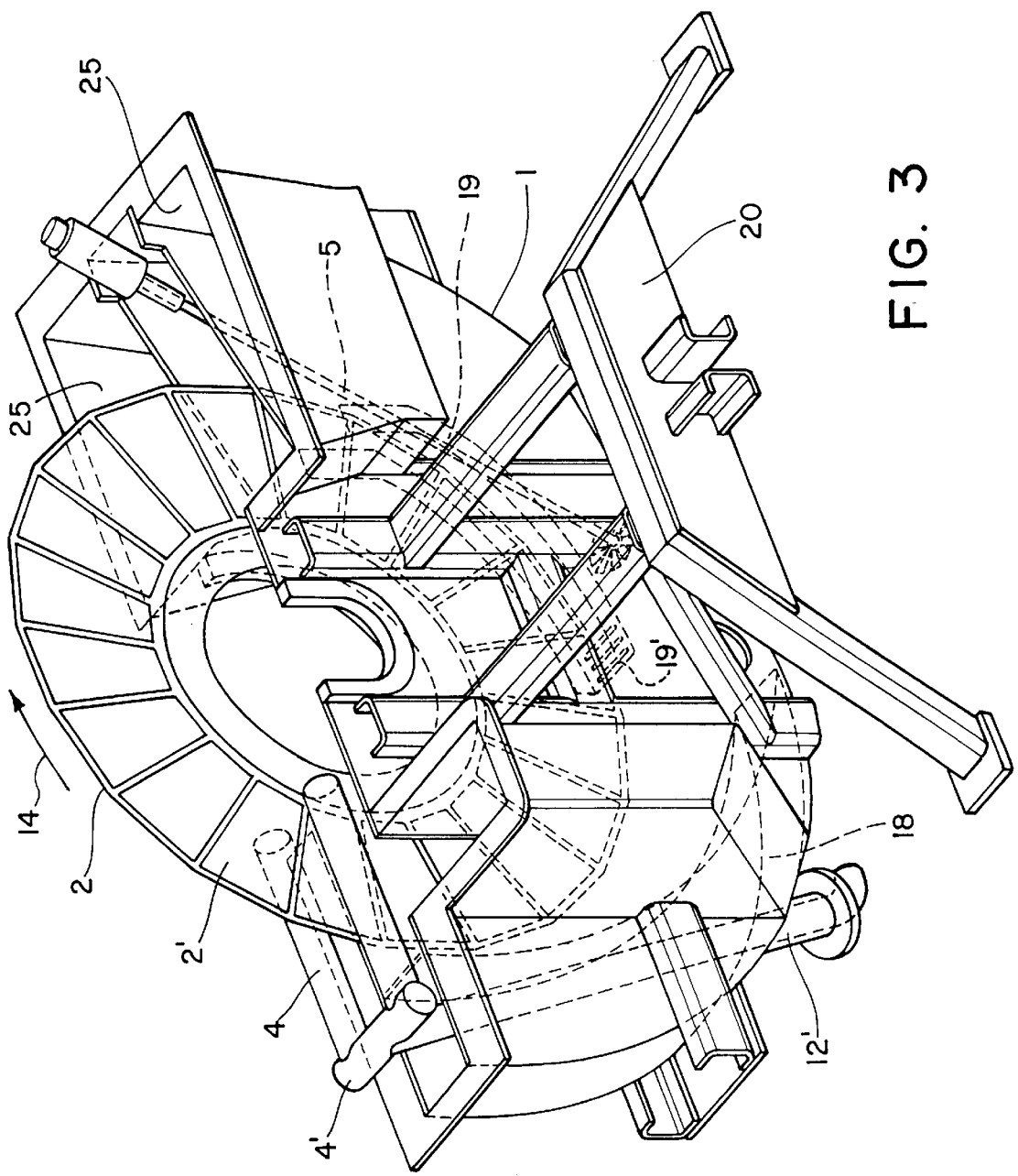
FIG. 3 shows a three-dimensional representation of the embodiment of FIG. 2.

A preferred design of the feeding means 4 with the embodiment according to FIGS. 2 and 3 is shown in FIGS. 4a and 4b in side view (FIG. 4a) and in plan view (FIG. 4b). Feeding means 4 consists of two parallel pipes which are partly cut out at 4" on the top. The suspension flows over an indented saw-toothed shape overflow edge 21 on the lateral border of the cut-out portions 4" into the suspension 3 in the filter trough 1. Discharge openings in the form of holes 22 or slots are provided to prevent sedimentation on the bottom of the feeding means 4.

Figure 5B:
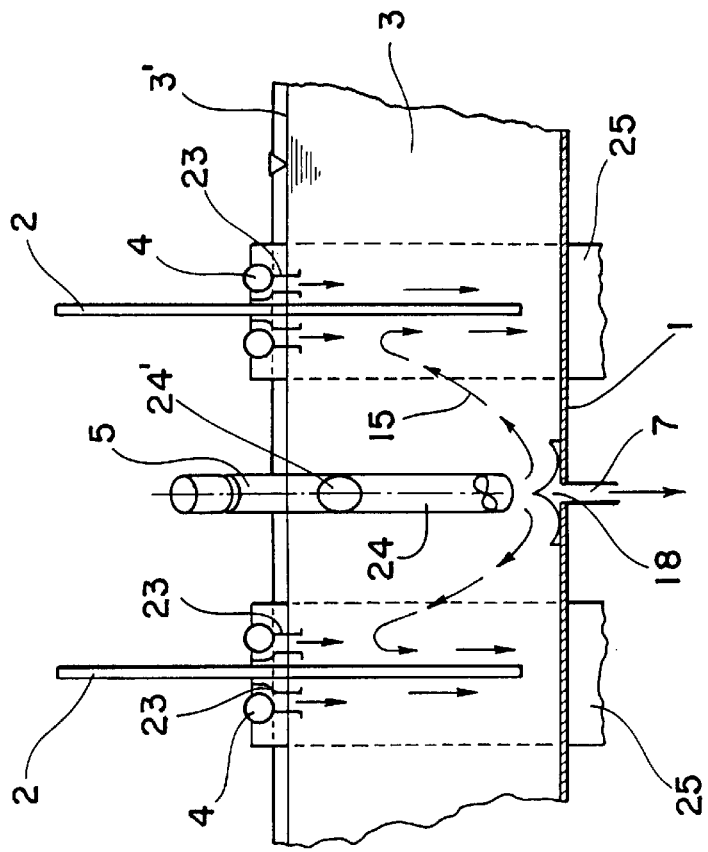
FIGS. 5a and 5b show side and end views of an embodiment of the invention with a rotary filter having several disks.
Figure 5A:
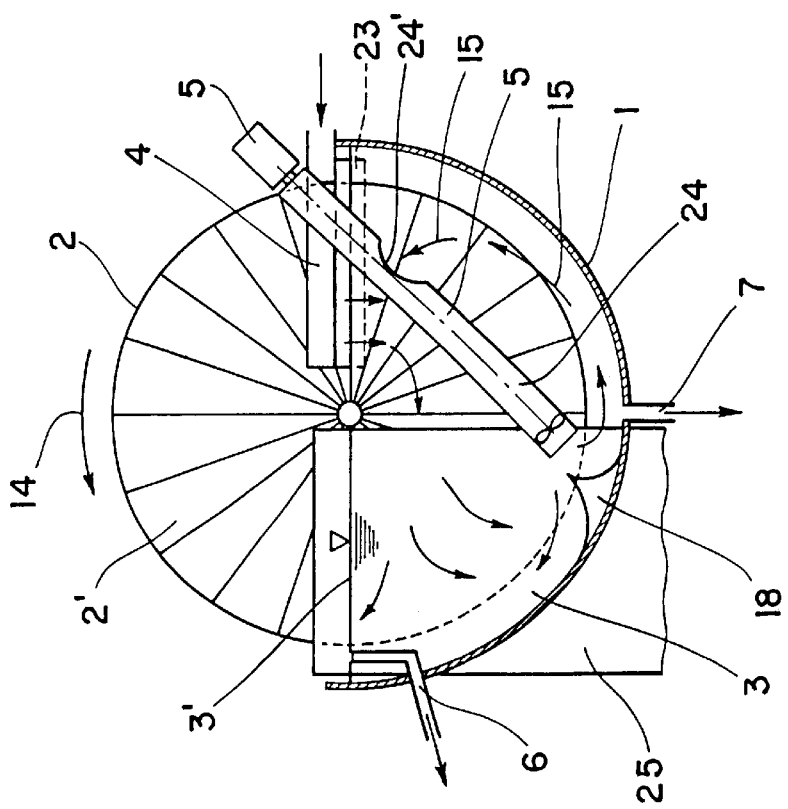

A further exemplary application of the invention is with a rotary filter having several disks, as shown in FIGS. 5a (lateral view) and 5b (front view). Deviating from the embodiment previously illustrated, a flow pipe 24 is used for the agitator 5 having an inlet 24' in the upper end and an outlet at the lower end. Agitator means may also be inserted in this pipe 24. In this embodiment, the agitator 5 is a propeller mounted on a rotating shaft. The form of the guiding means 18 is formed in such a way that the suspension flow is directed upwards along the filter disks 2 and adjacent the agitator 5 to slow down the suspension flowing from feeding means 4 to prevent rapid sedimentation. In order to generate as little turbulence as possible on the suspension surface 3', the suspension flows from the feeding device 4 along parallel guiding plates 23 extending below the suspension surface 3' into the suspension 3. As illustrated in FIG. 5a, the suspension may be withdrawn through the discharge opening 7 in the bottom of the filter trough 1. The suspension may be withdrawn from other locations in the filter trough 1 where sedimentation normally occurs. When more than two filter disks 2 are used, the arrangement shown in FIG. 5b is repeated accordingly so that an upwardly directed flow is produced on each side of a filter disk 2 to prevent rapid sedimentation of the heavier solid particles of the suspension.

Another embodiment for generating the additional directed flow 15 of or in the suspension 3 is shown in FIGS. 6b and 6b. A suspension supply 12" directly injects suspension upwards into the suspension 3 in the filter trough 1 through a suspension nozzle 26. The kinetic energy of the injected suspension 12" creates a flow 15 directed against the main supply direction of the suspension from feed 4. The other parts correspond to those shown in the other illustrated embodiments.

FIGS. 7a and 7b show a further embodiment where the filtration device is a drum filter 27. The feed and discharge means are as shown in the previous embodiments and are designated by the same reference numbers. Filter segments 2' are distributed along the shell of the cylindrical filter drum 36. A pivotally mounted swivelling agitator 5' shown in FIG. 7a is provided in the filter trough 1 for generating additional movement of or in the suspension. Instead of the agitator 5' shown in FIG. 7a, a suspension nozzle 12 extending along the length of the filter drum 36 or several smaller suspension nozzles may be used to produce the required additional flow movement of the suspension to prevent sedimentation as shown in FIG. 7b. Sedimentation is also effectively prevented by the suspension overflow 6 or the suspension discharge 7 on the bottom of the filter trough 1. Removal of the filter cake 31 from the filter drum 36 is by means of a scraper 35. Other known ways of removing the filter cake from the drum filter may also be used.

A further modification of the invention is shown in FIGS. 8a and 8b, where the filtration device is a flat bed filter 28. The filter cake 31 is formed on the filter medium 30 on the bottom of the filter container 29. An additional flow 15 of or in the suspension 3 is generated to produce a uniform thickness of the filter cake 31 and to prevent clogging of the filter medium 30. The induced flow is supported by an appropriate suspension discharge 7 and a suspension overflow 6. An agitator 5' in the form of a rotating flat blade or bar keeps the solids in suspension and homogenizes the mixture before being collected on the filter medium 30 or the filter cake 31. The filtrate is discharged through pipe 33 below the filter medium 30. FIG. 8c shows a section across a supply device 4 for a flat bed filter 28, including guiding plates 23 extending below the surface 3' of the suspension 3. In the embodiment shown, one of the guide plates 23 is attached to the feed pipe 4.

A further embodiment of the invention includes a candle filter 32, which may be operated under pressure. FIGS. 9a and 9b illustrate a device for inducing the additional flow in the filtration means. The induced flow 15 is generated by means of an agitator 5" in the lower region of the filter container 29. In the embodiment shown, the agitator 5" is a propeller blade mounted on rotating shaft which is driven by a suitable motor. The suspension 3 is introduced into the filter container 29 via feeding means 4. The filtrate is withdrawn through the filter candles 34 by suction means and discharged from the candle filter 32 through a conduit 33. An overflow 6 and a suspension discharge 7 to support flow 15 are included to prevent sedimentation of the mixture in the bottom of the filtration device. The solid particles collected on the filter candles 34 are removed after stopping the suspension supply and after releasing the pressure from the filter container. The collected solids may be removed from the filter by reverse flow of compressed air or filtrate and discharged from the filter container 29. FIG. 9c shows another embodiment of the feeding means 4, which is provided with an indented tooth-shaped overflow edge 21 and discharge bores 22 in the bottom of feed means 4. The suspension for the most part flows into the suspension 3 along the guiding plates 23.

FIGS. 10a and 10b illustrate a further embodiment for generating a flow 15 within the suspension by introducing an additional suspension 12" through several upwardly directed suspension nozzles 26 regularly distributed on the bottom of the filter container 29. The feed and discharge means and the filters are as in the previous embodiments and are designated by the same reference numbers.

The above embodiment also has applications for other solid-liquid mixtures where the solid components of the mixture tend to rapidly separate or precipitate from the liquid. According to the invention, the solid components of the mixture are prevented from partly or completely obstructing the filters or sieves or closing the pores or openings. Maintaining an additional flow in the suspension prevents rapid or irregular build-up of the filter cake and prevents clogging of the filter medium.

The illustrated examples show possible variants without claiming completeness. The invention is advantageously applicable whenever the components of solid-liquid mixtures are to be separated by means of filters, sieves or the like in an economical way and as quickly as possible. The invention is used primarily in cases where the solids tend to quickly settle, thereby obstructing the openings or pores of filters or sieve elements during the separation process. Thus, the present invention aims at maintaining the homogeneity of the mixture or suspension in the filter trough or the like to a sufficient extent while the components of the solid-liquid mixture are being separated and filtrated.

What is claimed is:

1. A process for filtering solid-liquid mixtures comprising:
    feeding a first solid-liquid mixture from a supply into a filtration device, said filtration device having a trough for containing said mixture and a rotating filter surface for rotating through said mixture in said trough, said feeding being directed from above or in proximity to a surface of said mixture in said trough,
    providing a guiding plate spaced from a sidewall of said trough and spaced from and substantially parallel to said filter surface above or below said surface of said mixture in said trough,
    directing said feed of said first mixture along said guiding plate substantially parallel to said filter surface and in a downward direction into said mixture in said trough to produce a first downward flow stream in said mixture in said trough,
    producing a second flow movement stream in said mixture in said trough directed against said first mixture flow stream and against a direction of settlement of solid particles in said mixture to maintain solids in suspension and resist settlement from said mixture in said filtration means, and
    rotating said filter through said mixture and filtering said mixture on said rotating filter surface.

2. The process of claim 1, wherein said guiding plate comprises a pair of spaced-apart plate members, each of said plate members being spaced from and substantially parallel to said sidewall of said trough and spaced from said filter surface, said process comprising feeding said first mixture between said plate members downwardly into said mixture contained in the trough to produce the first flow stream.

3. The process of claim 2, wherein said plate members extend below said surface of the mixture contained in said trough, and said process comprises feeding said first mixture between said plate members to prevent disturbing said surface of the mixture contained in said trough.

4. The process according to claim 1, comprising withdrawing a portion of said first mixture through an overflow outlet or through a discharge outlet below said surface of said first mixture in said filtration means to produce said second movement stream.

5. The process according to claim 4, comprising recycling a portion of the first mixture from the overflow outlet or through said discharge outlet to said supply.

6. The process according to claim 4, comprising providing said trough with said discharge outlet at a lowest point and withdrawing a portion of the mixture from said lowest point of said trough through said discharge outlet.

7. The process according to claim 1, wherein said filtration device includes an impeller in said trough, and wherein said process comprises actuating said impeller to produce said second movement stream of the mixture.

8. The process of claim 7, wherein said filtration device includes a disc filter and a guide plate positioned between said impeller and an outer circumference of said disc filter, said guide plate having sidewalls extending substantially parallel to opposite sides of said disc filter, and said process comprising producing said second flow movement stream between said trough and said guide plate.

9. The process according to claim 1, wherein said filtration device includes an injection nozzle positioned below the surface of the mixture in said trough, and wherein said process comprises injecting a second solid-liquid mixture into said mixture in said trough to produce said second movement stream.

10. The process according to claim 9, wherein said injection nozzle is positioned below said guiding plate, and said process comprises injecting said second mixture to produce said second movement stream upwardly toward said guiding plate.

11. The process of claim 1, comprising applying a pressure above atmospheric pressure to a surface of said mixture in said filtration device and to said filter surface, and filtering said mixture at an elevated pressure difference.

12. The process of claim 1 wherein said rotating filter surface is selected from the group consisting of drum filters and disc filters.

13. A process for filtering a solid-liquid mixture, comprising the steps of:
    providing a filtration device containing a solid-liquid mixture, said filtration device having sidewalls defining a filter trough, a rotating filter disc having filter surfaces spaced from and substantially parallel to said sidewalls, and a feed device positioned at a surface of said mixture, said feed device having a feed pipe with an elongated opening extending parallel to said surface of the mixture, and a pair of guiding plates adjacent said opening in said pipe and extending parallel to and spaced from said filter surface, and spaced from said sidewalls of said trough, feeding a solid-liquid mixture through said feed pipe and downwardly between said guiding plates into said mixture contained in the trough and producing a first downward flow stream in the mixture in the trough and in a direction substantially parallel to the filter surfaces, producing a second upward flow stream in the mixture and directing the second flow stream against the first flow stream and substantially parallel to the filter surface to resist settlement of solids in the trough, and rotating said filter disc whereby said filter surfaces rotate substantially parallel to said first and second flow steams to filter said mixture.

14. The process of claim 13, wherein said filtration device comprises a plurality of parallel rotating filter discs, and a plurality of said feed pipes and guiding plates, one of said feed pipes and guiding plates being positioned adjacent each filter surface of each filter disc, wherein said process comprises, feeding said first mixture through each of said feed pipes and between said guiding plates and producing a first flow stream substantially parallel to and adjacent each filter surface of said filter discs, and producing a plurality of said second flow streams directed upwardly against said first flow streams.

15. The process of claim 13, wherein said filtration device comprises a pair of said feed devices, a first of said feed devices being positioned adjacent a first side of said filter disc and a said second of said feed devices positioned adjacent a second side of said filter disc.

16. The process of claim 15, wherein said filtration device includes an injection nozzle positioned on each side of said filter disc below the surface of said mixture in the trough, wherein said process comprises injecting said mixture through said injection nozzles into said trough to produce a second upward flow stream on each side of said filter disc.

17. The process according to claim 13, comprising diverting said second flow stream of said mixture in said trough into at least two flow streams directed upwardly against the first flow movement stream.

18. The process of claim 13, comprising directing said second flow stream toward said guiding plates.

19. The process of claim 13, comprising providing a flow pipe and guide means in said trough and producing said second flow stream through said flow pipe and against said guide means for redirecting said second flow stream toward said filter disc and said first flow stream.

20. The process of claim 13, wherein said filtration device includes an injection nozzle positioned below the surface of said mixture in said trough, wherein said process further comprises directing said injection nozzle toward said feed device and injecting said mixture into said trough to produce said second flow stream.

21. The process of claim 20, wherein said injection nozzle includes an outlet opening having a length extending substantially parallel to said feed device, for producing said second flow stream substantially along a length of said feed device.

* * * * *